US011939203B2

(12) United States Patent
Dorney et al.

(10) Patent No.: US 11,939,203 B2
(45) Date of Patent: Mar. 26, 2024

(54) BEVERAGE DISPENSING SYSTEM

(71) Applicant: Validfill LLC, Bradenton, FL (US)

(72) Inventors: Peter Dorney, Warren, PA (US); Loren Ostema, Sarasota, FL (US)

(73) Assignee: VALIDFILL, LLC, Bradenton, FL (US)

( * ) Notice: Subject to any disclaimer, the term of this patent is extended or adjusted under 35 U.S.C. 154(b) by 0 days.

(21) Appl. No.: 17/938,476

(22) Filed: Oct. 6, 2022

(65) Prior Publication Data

US 2023/0109097 A1 Apr. 6, 2023

Related U.S. Application Data

(60) Provisional application No. 63/252,650, filed on Oct. 6, 2021.

(51) Int. Cl.
*B67D 1/08* (2006.01)
*B67D 1/12* (2006.01)

(52) U.S. Cl.
CPC ........... *B67D 1/0888* (2013.01); *B67D 1/124* (2013.01)

(58) Field of Classification Search
CPC .............................. B67D 1/0888; B67D 1/124
See application file for complete search history.

(56) References Cited

U.S. PATENT DOCUMENTS 1,934,445 A * 11/1933 Poplawski ............ A47J 43/046 222/448
1,944,810 A * 1/1934 Rogers .................... G07F 13/10 141/98
2,174,745 A * 10/1939 Hoffman ............... B67C 7/0006 141/49
4,942,464 A 7/1990 Milatz
7,513,412 B2 4/2009 Benedetti et al.
8,176,948 B2 * 5/2012 Carrig ..................... H04W 4/08 141/82
8,511,348 B2 8/2013 Lillard, Jr.
8,763,918 B2 7/2014 Lillard, Jr.
8,880,427 B1 11/2014 Jones
8,972,048 B2 3/2015 Canora et al.
8,973,822 B2 * 3/2015 Brown .................. G07F 13/025 235/383
9,292,993 B2 3/2016 Canter et al.
9,334,150 B1 5/2016 Ost et al.
9,646,314 B2 5/2017 Moore et al.
(Continued)

FOREIGN PATENT DOCUMENTS

WO WO-2019046174 A1 * 3/2019 ............... B67D 1/00
WO WO-2022027022 A1 * 2/2022 ............... B67D 1/00

*Primary Examiner* — Timothy L Maust
(74) *Attorney, Agent, or Firm* — Buchanan Ingersoll & Rooney PC

(57) ABSTRACT

Disclosed is a disbursing system including a dispensing unit and a read area having at least two readers. Each of the at least two readers is configured to generate a signal when detecting a marker disposed on a beverage container. The beverage container includes at least two markers. The system includes a switch in electro-mechanical connection with the dispensing unit. The system includes a control module in operative connection with the switch and in communication with the at least two readers. When the at least two readers generate at least two signals detecting at least two markers, the control module actuates the switch.

18 Claims, 4 Drawing Sheets

(56) References Cited

U.S. PATENT DOCUMENTS

| | | | | |
|---|---|---|---|---|
| 9,691,212 | B2 | 6/2017 | Green et al. | |
| 9,751,745 | B2 * | 9/2017 | Grottini | B67D 1/0801 |
| 10,101,080 | B2 | 10/2018 | Willis et al. | |
| 10,671,902 | B2 | 6/2020 | Ophardt et al. | |
| 11,084,707 | B2 * | 8/2021 | Wade | B67D 1/0888 |
| 11,208,315 | B2 * | 12/2021 | Crawford | G06Q 20/145 |
| 2006/0253346 | A1 | 11/2006 | Gomez | |
| 2014/0196811 | A1 * | 7/2014 | Ramos, III | G07F 13/065 141/2 |
| 2019/0330042 | A1 | 10/2019 | Enssle et al. | |
| 2021/0078848 | A1 * | 3/2021 | Nocchi | G06V 10/764 |
| 2021/0171333 | A1 | 6/2021 | Amos | |
| 2022/0112068 | A1 * | 4/2022 | Ljunggren | B67D 1/0022 |

* cited by examiner

BEVERAGE DISPENSING SYSTEM

CROSS-REFERENCE TO RELATED APPLICATIONS

This application is related to and claims the benefit of priority to U.S. provisional application No. 63/252,650, filed Oct. 6, 2021, the entire contents of which is incorporated herein by reference.

FIELD OF THE INVENTION

Embodiments relate to a beverage dispensing system that controls the flow of beverage based on information acquisitioned from a marker associated with a beverage container for the beverage. The system utilizes a switching apparatus that can selectively allow for disbursement based on the information acquisitioned. Information acquisitioned is obtained from at least two scanners, each scanner being positioned to read an individual marker (e.g., QR code) placed on the beverage container such that they co-align with the scanners when the beverage container is placed within a read area.

BACKGROUND OF THE INVENTION

Known apparatuses for controlling flow of beverage can be appreciated from U.S. Pat. Nos. 8,972,048, 8,511,348, 10,101,080, 9,334,150, US 20140196811, U.S. Pat. Nos. 10,671,902, 8,880,427, 9,691,212, 9,292,993, 8,763,918, US 20190330042, US 20060253346, U.S. Pat. No. 7,513,412, US 20210171333, U.S. Pat. Nos. 4,942,464, and 9,646,314. Known systems can be limited in that they fail to provide a means to prevent fraud, the fraud being committed by using a picture of a marker (e.g., QR code) to obtain beverage.

SUMMARY OF THE INVENTION

Embodiments relate to a beverage dispensing system that controls the flow of beverage based on information acquisitioned from a marker associated with a beverage container for the beverage. The system utilizes a switching apparatus that can selectively allow for disbursement based on the information acquisitioned. Information acquisitioned is obtained from at least two scanners. Each scanner can be positioned to be orthogonal (e.g., 90 degrees) to each other. The scanners can also be placed at predetermined distances and heights within a read area of the beverage dispensing system. Two QR codes (or other types of markers) are placed on the beverage container such that they co-align with the scanners when the beverage container is placed within the read area. The geometry of the read area and the geometry of the beverage container are such that it is difficult if not impossible to place a device(s) (e.g., two smartphones having images of the QR codes) other than the beverage container within the read area and still have co-alignment.

An exemplary embodiment relates to a dispensing system. The system can include a dispensing unit. The system can include a read area having at least two readers, each of the at least two readers configured to generate a signal when detecting a marker disposed on a beverage container, the beverage container having at least two markers associated therewith. The system can include a switch in electro-mechanical connection with the dispensing unit. The system can include a control module in operative connection with the switch and in communication with the at least two readers, wherein when the at least two readers generate at least two signals detecting at least two markers, the control module actuates the switch.

In some embodiments, the at least two readers includes a first reader and a second reader, the first reader being a same type of reader as the second reader.

In some embodiments, the at least two readers includes a first reader and a second reader, the first reader being a different type of reader as the second reader.

In some embodiments, any one or combination of the at least two readers includes an antenna, a scanner, a camera, a sensor, and/or a detector.

In some embodiments, each of the at least two readers includes a camera and/or sensor configured to identify an aspect of a marker of the at least two markers via optical character recognition and/or vision object detection and classification.

In some embodiments, each of the at least two readers includes a camera and/or sensor configured to identify a color, fluorescence, infrared emission, and/or ultraviolet emission of a marker of the at least two markers.

In some embodiments, the at least two readers includes a first reader and a second reader; the first reader positioned within the read area at a first location; the second reader positioned within the read area at a second location; and the first location is such that a line of sight of the first reader is orthogonal to a line of sight of the second reader.

In some embodiments, the system includes the beverage container.

In some embodiments, the at least two markers includes a first marker and a second marker, the first marker being a same type of marker as the second marker.

In some embodiments, the at least two markers includes a first marker and a second marker, the first marker being a different type of marker as the second marker.

In some embodiments, the at least two markers includes a marker configured as a Quick Response (QR) code.

In some embodiments, actuation of the switch causes the dispensing unit to dispense fluid.

In some embodiments, the system includes a structure defining the read area.

In some embodiments, the structure includes a structural element configured to hold the at least two readers in a predetermined position and force the beverage container into a position that will align or co-align the at least two readers with the at least two markers.

In some embodiments, the structure is dimensioned such that the beverage container fits within the read area in a keyed manner.

An exemplary embodiment relates to a detecting and control unit for a dispensing system. The unit can include a structure defining a read area, the read area having at least two readers, each of the at least two readers configured to generate a signal when detecting a marker disposed on a beverage container, the beverage container having at least two markers associated therewith. The unit can include a switch in electro-mechanical connection with a dispensing unit. The unit can include a control module in operative connection with the switch and in communication with the at least two readers, wherein when the at least two readers generate at least two signals detecting at least two markers, the control module actuates the switch.

In some embodiments, actuation of the switch causes the dispensing unit to dispense fluid.

In some embodiments, the unit includes the dispensing unit.

In some embodiments, the at least two readers includes a first reader and a second reader; the first reader positioned within the read area at a first location; the second reader positioned within the read area at a second location; and the first location is such that a line of sight of the first reader is orthogonal to a line of sight of the second reader.

In some embodiments, each of the at least two readers includes: a camera and/or sensor configured to identify an aspect of a marker of the at least two markers via optical character recognition and/or vision object detection and classification; and/or a camera and/or sensor configured to identify a color, fluorescence, infrared emission, and/or ultraviolet emission of a marker of the at least two markers.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

Figure 1:
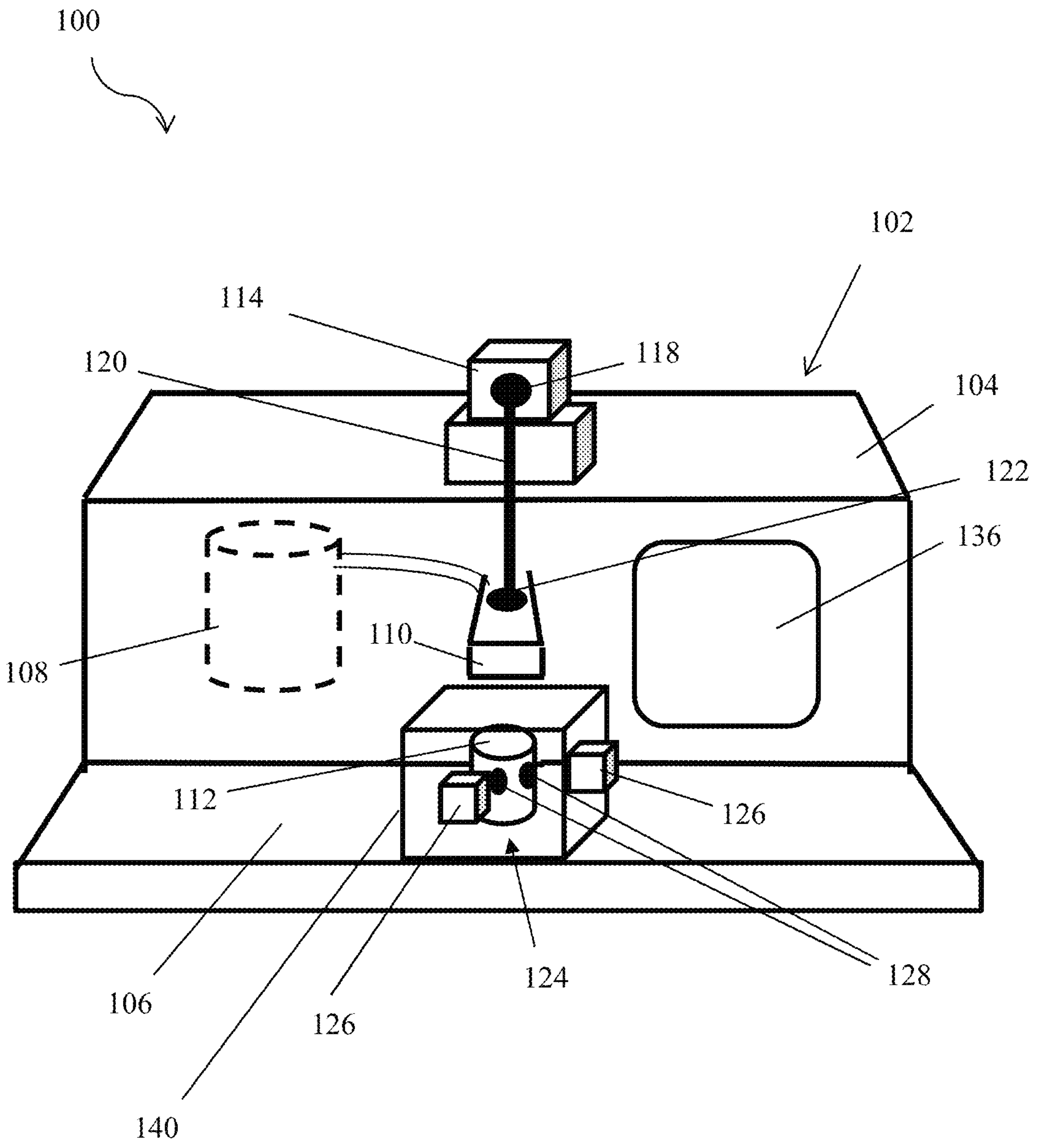
FIG. 1 shows an embodiment of the beverage dispensing system.

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Referring to FIGS. 1-4, embodiments can include a beverage dispensing system 100 configured for controlling flow of beverage. The beverage dispensing system 100 can be an electro-mechanical system having dispensing nozzles, dispensing heads, dispensing taps, pumps, etc. to dispense beverage in an automated or semi-automated fashion. The beverage to be dispensed can be water, juice, carbonated beverage, beer, wine, pre-mixed drinks (alcoholic or non-alcoholic), etc. The beverage dispensing system 100 includes, or can be configured to be used with, a dispensing unit 102 having a housing 104 with a beverage tray 106, a beverage reservoir 108, hoses, pumps, ports 110 etc. to facilitate flow of beverage from the beverage reservoir 108, through a port 110, and to a beverage container 112 (e.g., a glass or cup) for human consumption. The electro-mechanics of such beverage dispensing units 102 are common and well known.

In the exemplary embodiment shown in FIG. 1, the beverage dispensing system 100 can include at least one dispensing head 114. Any one or combination of dispensing heads 114 can include a dispenser 118. The dispenser 118 includes the connection lines from the beverage reservoir 108 to any one or combination of ports 110 of the dispensing unit 102. Means of dispensing can vary, but the dispenser 118 shown in FIG. 1 includes a stem 120 for facilitating actuation of a disc 122. Actuation of the dispenser 118 (e.g., a push button actuating a motor in connection with the stem 120) causes the stem 122 to rotate, thereby causing the disc 122 to rotate for selective obstruction of the port 110. Obstructing the port 110 involves preventing flow of beverage out-from the port 110. Acting on the stem 120 can cause the disc 122 to rotate so as to generate a degree of obstruction in the port 110 (e.g., ranging from being fully obstructed to fully un-obstructed). The degree of obstruction can be used to control a flow rate for the beverage being dispensed from the port 110. The dispenser 118 can also have gaskets, flanges, valves, nozzles, etc. to facilitate the controlled containment and disbursement of beverage. It should be noted that the system 100 illustration in FIG. 1 is exemplary and that other system 100 configurations for disbursement of beverage can be used.

The beverage dispensing system 100 can include a read area 124. The read area 124 can be a structure (e.g., housing, cage, etc.), an opening formed into the housing 104, etc. that contains at least one reader 126. The reader 126 can be an antenna, a scanner, a camera, sensor, detector, etc. For instance, the reader 126 can be configured as an RFID reader having a radio frequency transponder, a radio receiver, and transmitter. The RFID reader can transmit an electromagnetic interrogation pulse to an RFID tag of the marker 128, whereby the marker 128 can transmit digital data back to the reader 126. This is a non-limiting example, and other RFID system configurations can be used. As another example the reader 126 can be a camera or optical scanner configured to capture an image of the marker 126 (e.g., QR code). The camera or scanner can include optical character recognition software, vision object detection and classification software, etc. to identify aspects of the marker. As another example, the reader 126 can be a sensor configured to detect an electromagnetic emission, reflection, absorption, etc. of the marker so as to detect a color, fluorescence, infrared emission, ultraviolet emission, etc. The reader 126 can include any one or combination of these types of detection, identification, and tracking techniques. The system 100 can include one or more types of readers 126.

The read area 124 can be defined by a structure 140 that is dimensioned such that the beverage container 112 fits therein in a keyed manner. For instance, the profile of the interior of the read area 124 can conform to the profile (e.g., the geometric shape) of the beverage container 112 such that the beverage container 112 can be slid in and out of the read area 124 via a user's hand but that the only objects that match the profile of the beverage container 112 can fit within the read area 124. This will prevent a user from using container types other than ones approved or desired for use with the system 100, placing additional objects within the read area 124 along with the beverage container 112, etc. For instance, and as will be explained herein, an aspect of the system 100 uses at least two readers 126 in the read area 124 to scan for two markers 128 positioned on the beverage container 112. Placement of the markers 128, placement of the readers 126, and the profiles of the beverage container 112 and the read area 124 interior prevent a user from capturing an image of a marker 128 on their smartphone and receiving beverage by placing their phone with a displayed image of the marker 128 within the read area 124 (either placing the smartphone in the read area 124 alone or placing it in the read area 124 with the beverage container 112).

Placement of the markers 128, placement of the readers 126, and the profiles of the beverage container 112 and the read area 124 interior also prevent a user from inserting two or more smartphones within the read area 124 to as to cause the system 100 to read from the two or more smartphones. In other words, this configuration renders it difficult, if not impossible, to defraud the system 100.

The read area 124 can include a structure 140 within which the beverage container 112 is placed. This structure 140 can include an encasement, a housing, structural element, etc. that holds the reader(s) 126 in a desired position and also force the beverage container 112 into a position that will align or co-align the reader(s) 126 with the marker(s) 128. For instance, when a beverage container 112 is placed within the read area 124, the shape and configuration of the structure 140 can force the beverage container 112 to be positioned and oriented so as to force the marker(s) 128 to be in alignment or co-alignment with the reader(s) 126. As an example, the structure 140 can include structural elements positioned a predetermined locations within the read area 124 that act as mechanical guides. When the beverage container 112 is placed in the read area 124 the structural elements can prevent any positioning and/or orientation of the beverage container 112 other than a position and orientation that provides adequate alignment or co-alignment between the reader(s) 126 and the marker(s) 128. This can be achieved by knowing the type, style, size, and shape of the beverage container(s) 112 that are intended for use with the system 100. If the beverage container(s) 112 is a tumbler type container with a handle, the structural elements can be positioned such that the beverage container 112 can only be inserted if positioned and oriented such that the handle slides over the elements. This is just one example, and one skilled in the art would understand, with the benefit of the present disclosure, how to configure the structure 140 in other ways to achieve a forced alignment or co-alignment of reader(s) 126 and marker(s) 128. Alignment or co-alignment includes having the marker(s) 128 in a position and orientation that allows the reader(s) 126 to effectively read, scan, sense, etc. the information of the marker(s) 128. Having such a configuration can assist with increasing through-put of the system 100 when in use. For instance, if the system 100 is used in a high volume situation (e.g., theme park, sporting event, etc.), it would be advantageous to obviate interruptions in service due to inadequate reading by the reader(s) 126.

It is contemplated for there to be two readers 126 within the read area 124, but more than two can be used. With reference to a Cartesian coordinate system within the read area 124 (e.g., the position on the tray 106 within the read area 124 upon which the beverage container 112 is placed representing the (0,0,0) coordinate), it is also contemplated for each reader 126 to be positioned so as to be orthogonal to another reader 126. Thus, one reader 126 can be positioned at (1,0,1) and another reader 126 at (0,1,1). Each reader 126 can be configured such that it can only read a marker 128 when that marker 128 is co-aligned with that reader 126 on the Cartesian coordinate. Thus, in the example above in which the first reader 126 is located at (1,0,1), the first reader 126 can only read a marker 128 that is located on the beverage container 112 at the coordinate (x,0,1), where x is a value less than 1. Similarly, the second reader located at (0,1,1) can only read a marker 128 that is located on the beverage container 112 at the coordinate (0,x,1), where x is a value less than 1. Thus, the first reader's line of sight can be orthogonal to the second reader's line of sight. This placement of the readers 126 can render it more difficult to defraud the system 100. It should be noted that other relative placements of the readers 126 with respect to each other can be used. Furthermore, a relative placement between a first and a second reader 126 can be the same or different from a relative placement between the first reader 126 and a third reader 126, etc.

Figure 2:
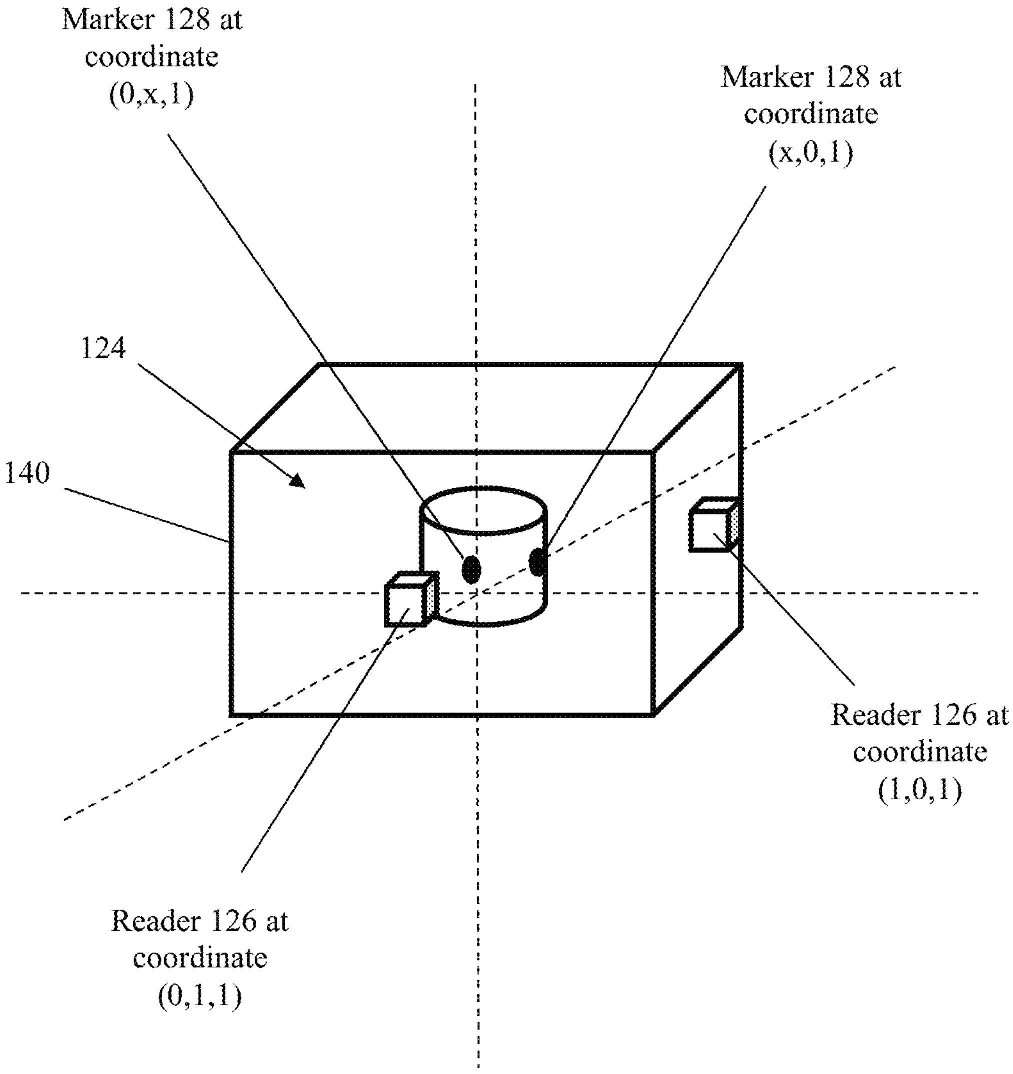
FIG. 2 shows an exemplary embodiment of the read area superimposed within a Cartesian coordinate system.
Figure 3:
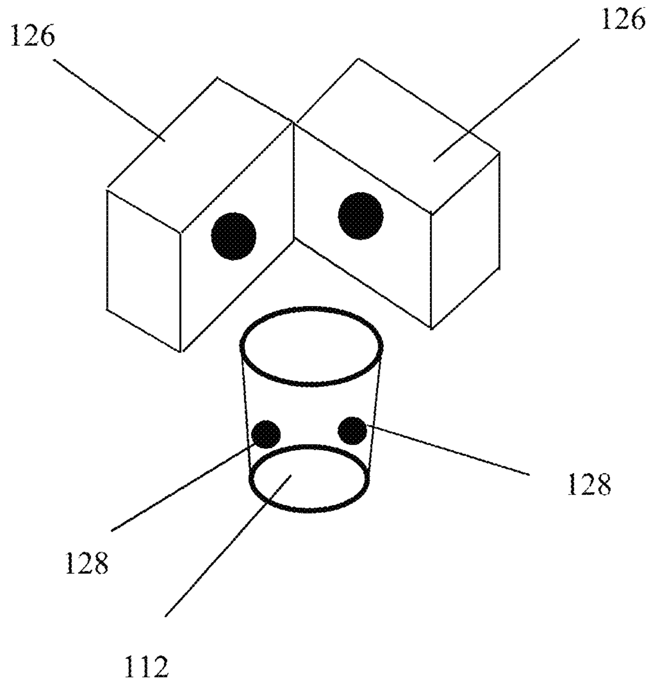
FIG. 3 shows another exemplary embodiment of the read area.
Figure 4:
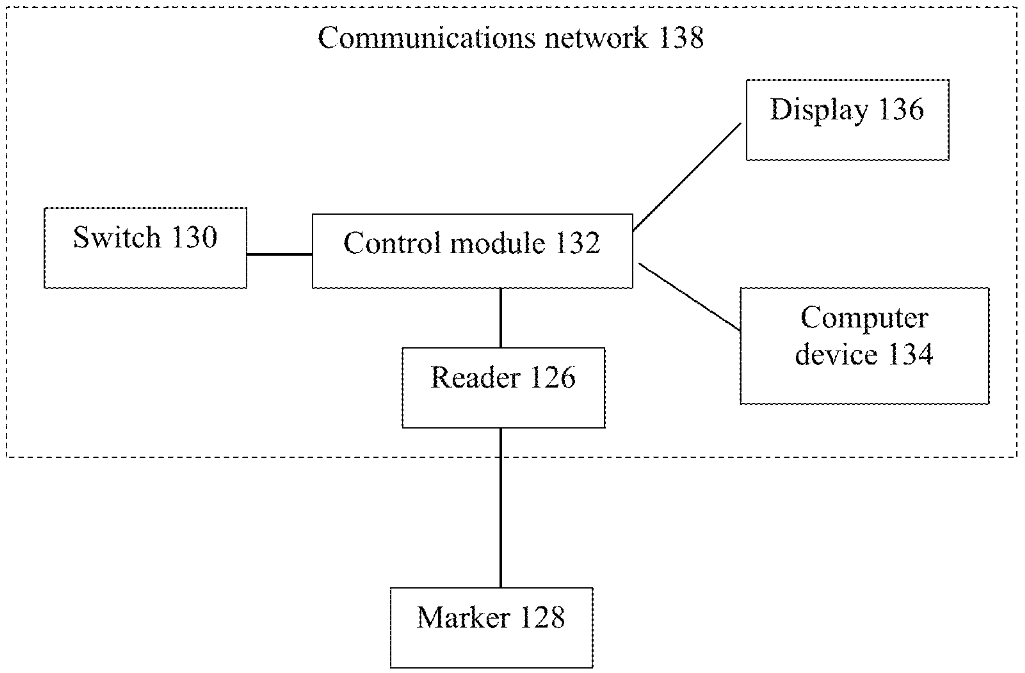
FIG. 4 shows an exemplary architecture of a computer system network that can be used with an embodiment of the system.

The read area 124 configurations shown in FIGS. 1-2 are exemplary. It is understood that any configuration of the read area 124 can be used, provided the readers 126 can co-align with the markers 128. FIG. 3 shows another exemplary read area 124 configuration that may be used.

The beverage dispensing system 100 can include a marker 128. The marker 128 can include an information-bearing mark. This can include paint, ink, barcode, fluorescent pigment, magnetic strip material, condition-response smart material, embossed material, imprinted material, RFID tag (active or passive), ultraviolet light responsive material, Quick Response (QR) code, etc. The marker 128 can be associated with the beverage container 112. This can include being attached to the beverage container 112, molded into the beverage container 112, formed in or on the beverage container 112, embedded within the beverage container 112, printed on the beverage container 112, written as code on the beverage container 112, attached as a film on the beverage container 112, etc. The marker 128 can also be a sensor. Any one type or combination of types of markers 128 can be used. The marker 128 can be configured to exhibit a certain detectable property (e.g., have a certain shape, have a certain thickness, have a certain pattern, emit a certain wavelength, generate a certain chemical response, emit a certain signal, have a certain temperature, exhibit a certain optical, magnetic, and/or mechanical property, have a certain color, etc.). This detectable property can be used as information for identifying, tracking, and/or monitoring the beverage container 112 the beverage dispensed in the beverage container 112, and/or the habits of a user using the beverage container 112, consuming beverage, and/or using the system 100.

A switch 130 can be located within the dispenser 118. The switch 130 can be configured to selectively cause the stem 120 or disc 122 to rotate (e.g., the switch 130 can be in electro-mechanical connection with the motor that rotates the stem 120, the switch 130 can act as the motor, etc.). For instance, the switch 130 can be a magnetic field generator (e.g., electro-magnet, a solenoid switch, etc.) that generates a magnetic field when activated. The magnetic field can impose an attractive force on the stem 120 or disc 122 to cause the stem 120 or disc 122 to rotate. Other switching mechanisms can be used. Actuation of the switch 130 can cause the dispenser 118 to dispense fluid (e.g. beverage), which can include dispensing fluid into the beverage container 112.

The system 100 can include a control module 132. The control module 132 can be configured to control switching operations of the switch 130. Explained in more detail later are other components that may be part of the beverage dispensing system 100, which can include a computer device 134 and a display 136. Any one or combination of the control module 132, the computer device 134, the switch 130, the display 136, and the reader 126 can have, or be in connection with, a processor unit and/or a transceiver unit. This can be done to allow any one of these components to communicate with each other, transmit and receive command signals, act upon each other, etc. For example, any of these components can have an application programming interface (API) and/or other interface configured to facilitate the control module 132 and/or computer device 134 that is in communication with that component executing commands and controlling aspects of the beverage dispensing system 100. For instance, embodiments of the control module 132 and/or computer device 134 can be programmed to generate a user interface configured to facilitate control of and display of various operational aspects of the beverage dispensing system 100.

An exemplary control module 132 architecture can be configured as a single board computer that incorporates two Radio Frequency Identification (RFID) ports, a multiple General Purpose Input/Output (GPIO) port, and on-board relays. The control module 132 architecture can provide the ability to switch processors via a computer-on-module (COM) express module. The COM express module can be a processing unit configured to integrate core Central Processing Unit (CPU) and memory functionalities of Personal Computer Advanced Technology Input/Output (PC/AT I/O), Universal Serial Bus (USB), audio, graphics, and local area networking, in which all I/O signals can be mapped to high density, low profile connections. Embodiments of the COM express module architecture can be structured as a mezzanine-based approach to allow the COM express module to be plug into an application-specific baseboard. The control module 132 architecture can further include a removable hard drive and a built-in RFID reader with on-board multiplexer. The control module 132 architecture can provide a versatile design that can be used as a single common hardware platform for multiple dispensing units 102.

In some embodiments, the control module 132 can be hardwired to the switch 130. This hardwire connection can allow the control module 132 to supply the electrical power necessary to operate the switch 130 and provide the communication link between the control module 132 and the switch 130. In some embodiments, the control module 132 can be in wireless communication with the switch 130 (e.g., via a transceiver). In such cases, the switch 130 can be in connection with a separate power supply. Alternatively, the dispenser 118 can include a battery unit in connection with the switch 130 to supply the necessary electrical power to operate the switch 130.

Some embodiments of the beverage dispensing system 100 can include a computer device 134. The computer device 134 can be a processor with an associated memory (e.g., a database). The computer device 134 can be a personal computer, laptop computer, mainframe computer, server, electronic mobile device (e.g., smartphone, tablet, etc.), etc. The computer device 134 can be used to control various aspects of the beverage dispensing system 100, establish user interfaces, establish a computer system network (e.g., a network of a plurality of dispensing systems 100, computer devices 176, etc.), establish a communications network 138, process certain data, send and retrieve data to and from the database, etc.

Any of the processors disclosed herein can be part of or in communication with a machine (e.g., a computer device, a logic device, a circuit, an operating module (hardware, software, and/or firmware), etc.). The processor can be hardware (e.g., processor, integrated circuit, central processing unit, microprocessor, core processor, computer device, etc.), firmware, software, etc. configured to perform operations by execution of instructions embodied in computer program code, algorithms, program logic, control, logic, data processing program logic, artificial intelligence programming, machine learning programming, artificial neural network programming, automated reasoning programming, etc. The processor can receive, process, and/or store data related to the marker (e.g., QR code), for example.

Any of the processors disclosed herein can be a scalable processor, a parallelizable processor, a multi-thread processing processor, etc. The processor can be a computer in which the processing power is selected as a function of anticipated network traffic (e.g. data flow). The processor can include any integrated circuit or other electronic device (or collection of devices) capable of performing an operation on at least one instruction, which can include a Reduced Instruction Set Core (RISC) processor, a CISC microprocessor, a Microcontroller Unit (MCU), a CISC-based Central Processing Unit (CPU), a Digital Signal Processor (DSP), etc. The hardware of such devices may be integrated onto a single substrate (e.g., silicon "die"), or distributed among two or more substrates. Various functional aspects of the processor may be implemented solely as software or firmware associated with the processor.

Use of processors herein can include any one or combination of a Graphics Processing Unit (GPU), a Field Programmable Gate Array (FPGA), a Central Processing Unit (CPU), etc. The processor can include one or more processing or operating modules. A processing or operating module can be a software or firmware operating module configured to implement any of the functions disclosed herein. The processing or operating module can be embodied as software and stored in memory, the memory being operatively associated with the processor. A processing module can be embodied as a web application, a desktop application, a console application, etc.

The processor can include or be associated with a computer or machine readable medium. The computer or machine readable medium can include memory. Any of the memory discussed herein can be computer readable memory configured to store data. The memory can include a volatile or non-volatile, transitory or non-transitory memory, and be embodied as an in-memory, an active memory, a cloud memory, etc. Examples of memory can include flash memory, Random Access Memory (RAM), Read Only Memory (ROM), Programmable Read only Memory (PROM), Erasable Programmable Read only Memory (EPROM), Electronically Erasable Programmable Read only Memory (EEPROM), FLASH-EPROM, Compact Disc (CD)-ROM, Digital Optical Disc DVD), optical storage, optical medium, a carrier wave, magnetic cassettes, magnetic tape, magnetic disk storage or other magnetic storage devices, or any other medium which can be used to store the desired information and which can accessed by the processor.

The memory can be a non-transitory computer-readable medium. The term "computer-readable medium" (or "machine-readable medium") as used herein is an extensible term that refers to any medium or any memory, that participates in providing instructions to the processor for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, transmission media, etc. The computer or machine readable medium can be configured to store one or more instructions thereon. The instructions can be in the form of algorithms, program logic, etc. that cause the processor to execute any of the functions disclosed herein.

Embodiments of the memory can include a processor module and other circuitry to allow for the transfer of data to and from the memory, which can include to and from other components of a communication system. This transfer can be via hardwire or wireless transmission. The communication system can include transceivers, which can be used in combination with switches, receivers, transmitters, routers, gateways, wave-guides, etc. to facilitate communications via a communication approach or protocol for controlled and coordinated signal transmission and processing to any other component or combination of components of the communication system. The transmission can be via a communication link. The communication link can be electronic-based, optical-based, opto-electronic-based, quantum-based, etc. Communications can be via Bluetooth, near field communications, cellular communications, telemetry communications, Internet communications, etc.

Transmission of data and signals can be via transmission media. Transmission media can include coaxial cables, copper wire, fiber optics, etc. Transmission media can also take the form of acoustic or light waves, such as those generated during radio-wave and infrared data communications, or other form of propagated signals (e.g., carrier waves, digital signals, etc.).

Any of the processors can be in communication with other processors of other devices (e.g., a computer device, a computer system, a laptop computer, a desktop computer, etc.). For instance, the processor of the control module 132 can be in communication with the processor of the computer device 134, the processor of the computer device 134 can be in communication with the processor of the display 136, etc. Any of the processors can have transceivers or other communication devices/circuitry to facilitate transmission and reception of wireless signals. Any of the processors can include an Application Programming Interface (API) as a software intermediary that allows two or more applications to talk to each other. Use of an API can allow software of the processor of the system 100 to communicate with software of the processor of the other device(s).

Any of the components of the beverage dispensing system 100 can be part of, or in connection with, a communications network 138. For example, any of the components can include switches, transmitters, transceivers, routers, gateways, etc. to facilitate communications via a communication protocol that facilitates controlled and coordinated signal transmission and processing. The communication links can be established by communication protocols that allow components to form a communication interface. For instance, the communication interface can be configured to allow the computer device 134 and another component of the system 100 to form a communications network 138. The communications network 138 can be configured as a long range wired or a wireless network, such as an Ethernet, telephone, Wi-Fi, Bluetooth, near-filed communication (NFC), wireless protocol, cellular, satellite network, cloud computing network, etc. Embodiments of the communications network 138 can be configured as a predetermined network topology. This can include a mesh network topology, a point-to-point network topology, a ring (or peer-to-peer) network topology, a star (point-to-multiple) network topology, or any combination thereof.

The information in the marker 128 can be encoded by the computer device 134. In some embodiments, the marker 128 can be re-coded to provide updated information, so the marker 128 should be able to be written and re-written with the information. In some embodiments, the beverage dispensing system 100 can be configured to track various aspects of its use and control various aspects of its operation based on that used. For instance, the beverage dispensing system 100 can be configured: a) to identify individuals who are authorized (e.g., age requirement, being a member of a club, etc.) to use the beverage dispensing system 100 to obtain a certain type of beverage from a certain tap and control the disbursement of beverage based on that information; b) identify the type, shape, and contour of beverage container 112 used by the user and control the disbursement of beverage based on that information; c) identify the amount or frequency of drinks a user consumes and control the disbursement of beverage based on that information (including setting a wait period before the user can obtain another drink); d) identify the amount of beverage a user has dispensed and notify the user the amount of beverage left to be disbursed based on that information (as well as control the disbursement of beverage based on that information); e) determine the caloric intake a user consumes and notify the user of the same; f) track when, where, and the type of beverage a user consumes over a given period; etc.

In this regard, the marker 128, after being associated with the beverage container 112, can have the marker information encoded into it by the computer device 134. The marker information can include personal ID information about the user (e.g., name, age, whether the user is a member of an association, biometric data such as fingerprint information, retina information, etc.), beverage container 112 information (e.g., type, shape, size, and contour of the beverage container 112), and account use information (e.g., whether the user established an account and how much beverage the user purchased via that account, the number of fills or re-fills a user is able to obtain based on the amount of beverage the user purchased, statistical data regarding the user's beverage dispensing system 100 use (or use of other beverage dispensing systems 100 on the computer system network), behavioral trends based on the statistical data, etc.). The marker 128 information can also be transmitted to the database for storage, analysis, and retrieval by the computer device 134.

The reader 126 can be configured to acquisition the marker information and transmit it to the control module 132 and/or computer device 134. The reader 126 can be any one or combination of an antenna, a scanner, a camera, etc. The type of reader 126 would depend on the type of marker 128 being used.

The beverage dispensing system 100 can include a display 136 configured to display information about the beverage dispensing system 100, the use of the beverage dispensing system 100 (e.g. type beverage consumed, number of times the system has been used, wait times for disbursement of the next beverage, etc.), operational aspects of the beverage dispensing system 100 (e.g., temperature of the beverage, whether a beverage is out of stock, recommended dispensing flow rate, actual dispensing flow rate, amount of beverage dispensed, amount of beverage left in the beverage reservoir 108, etc.), marker information (e.g., whether the beverage container 112 is invalid for use), personal ID information (e.g., whether the use if authorized for use), beverage container 112 information (e.g., type, size, shape, and contour of beverage container 112, etc.), account use information (e.g., number of fills obtained, number of re-filled remaining, etc.), instructions or tutorials about the beverage dispensing system 100, advertisements content, marketing content, entertainment content, etc. The display 136 can be a monitor (e.g., light emitting diode (LED) array, liquid crystal display (LCD) array, etc.) configured to display a user interface or a display screen. The information can be displayed as textual information or graphical information. The text can be scrolling, flashing, animated, etc. The display 136 can be located in or on the dispensing unit 102

(e.g., the housing 104), in or on any other component of the beverage dispensing system 100, and/or placed in a location that is not in or on any of the components of the dispensing system 100 (e.g., on a structure separate from the dispensing unit 102).

As noted herein, an objective of the system 100 is to prevent a user from defrauding the system 100. Thus, the control module 132 can include program instructions to maintain or default the switch 130 to a closed position (e.g., the disc 122 obstructs flow from the port 100 such that no beverage can be disbursed from the port 110). The closed position remains unless and until the reader(s) 186 transmit a signal to the control module 132 that it/they have detected a marker 128. Once the control module 132 receives the requisite signal, it activates the switch 130 to allow for disbursement from the port 110. For instance, the control module 132 can activate the switch 130 to cause a predetermined rotation of the disc 122 so as to generate a predetermined flow rate and for a predetermined time. After the predetermined time has lapsed, the control module 132 can activate the switch 130 back to a closed position.

It should be noted that the switch 130 can be used to lock and unlock the stem 120 or disc 122, as opposed to rotating it/them. For instance, the switch 130 can be configured to prevent rotation of the stem 120 or disc 122 by a motor when in the closed position unless and until the control module 132 generates a signal to cause the switch 130 to unlock the stem 120 or disc 122. Once unlocked, the stem 120 or disc 122 can be rotated by another mechanism (which may be activated or actuated by a user). After a predetermined time, the control module 132 can generate a signal to cause the stem 120 or disc 122 to obstruct the opening of the port 110, whereby the switch 130 locks the stem 120 or disc 122 in place until another signal is generated by the control module 132 to unlock.

As another example, the switch 130 can selectively supply electrical power to the motor in connection with the stem 120 based on signals received by the control module 132.

As noted above, it is contemplated for the system 100 to not disburse beverage unless a beverage container 112 having at least two markers 128 is inserted within the read area 124 and each marker 128 is aligned with a reader 126. Thus, the control module 132 can be programmed to generate a signal to open the switch 130 only when it receives signals from a requisite number of readers 126. Some implementations may require signals from two readers 126, from three readers 126, etc. before the control module 132 will generate a signal to open the switch 130.

It is contemplated for the system 100 to use at least two markers 128 and at least two readers 126, but the system can use any number of readers 126 and markers 128. Further, the number of readers 126 used need not match the number of markers 128 used. For instance, it may be the case that a system 100 has three or four readers 126, but the system 100 can be configured to operate with beverage containers 112 having only two markers 128—e.g., the control module 132 can be programmed to only require signals from two of its readers 126. Similarly, it may be the case that the beverage container 112 has three or four markers 128, but the system 100 can be configured to operate with only two readers 126—i.e., the control module 132 can be programmed to only require signals from the two readers 126.

As noted above, the computer device 134 can be used to encode marker information on the markers 128 of the beverage container 112. The marker information can include an indication of how many markers 128 are on the beverage container 112, the coordinate location of the markers 128, etc. The readers 126 can acquisition this information and transmit it to the control module 132. The control module 132 can process this information to know how many markers 128 are present, how many reader signals it should receive, from which readers 126 the signals should be coming from, etc.

In an exemplary implementation, a user purchases a beverage container 112. The beverage container 112 has at least one marker 128, but preferably two markers 128. The computer device 134 is used to encode marker information for the markers 128. This information can include the amount of beverage a user purchased for the beverage container 112, the amount of beverage dispensed to the beverage container 112, etc. For instance, the user may have purchased 36 fluid ounces of beverage. This can be encoded into the markers 128 so that when read by the reader 126 the system 100 can track and control disbursement of beverage such that no more than 36 fluid ounces are disbursed unless the user purchases more. The user can use the dispensing unit 102 as many times as they wish to obtain the 36 fluid ounces but once 36 fluid ounces has been disbursed, the system 100 will prevent any further disbursement until a user purchases additional amount of beverage. When a user inserts the beverage container 112 into the read area 124 and the markers 128 are read by the readers 126, the information is sent to the control module 132. The control module 132 stores the encoded marker information, including the amount of beverage a user purchased for the beverage container 112 and the amount of beverage already dispensed to the beverage container 112. Some dispensing units 102 allow a user to select how much beverage is to be disbursed so a user may select an amount that is less than the full amount purchased. The control module 134 keeps a running tally of the total amount of beverage disbursed. When the total amount of beverage disbursed equals the amount purchased, the control module 134 prevents any further disbursement of beverage for that beverage container 112. To obtain more beverage a user will have to purchase more, wherein the computer device 134 encodes the markers 128 with the updated beverage amount to be disbursed. It should be noted that a user can purchase more beverage at any time; and need not wait until the previous amount purchased is depleted.

In addition, or in the alternative, the purchase information can be set by a time period. For instance, a user can purchase beverage disbursement for a period of time (e.g., 3 hours, 12 hours, 24 hours, etc.). A user can then use the dispensing unit 102 for that period of time, after which the control module 134 prevents further disbursement. Thus, the time period of disbursement can be encoded into the markers 128 so that when read by the reader 126, the system 100 can track and control disbursement of beverage such disbursement can only occur during that time period for that beverage container 112 unless the user purchases more (more time). The user can use the dispensing unit 102 as many times as they wish during the time period (unless also limited by an amount of beverage, limited by so much beverage per sub-time period, etc.) but once the time period elapses, the system 100 will prevent any further disbursement until a user purchases additional time. When a user inserts the beverage container 112 into the read area 124 and the markers 128 are read by the readers 126, the information is sent to the control module 132. The control module 132 stores the encoded marker information, including the time period for beverage disbursement to the beverage container 112. When the time period elapses, the control module 134 prevents any further disbursement of beverage for that beverage container 112. To obtain more beverage a user will have to purchase more, wherein the computer device 134 encodes the markers 128 with the updated beverage time. It should be noted that a user can purchase more time at any time; and need not wait until the previous amount purchased has elapsed. The time period can be a predetermined block of time (e.g., 1 hour), a predetermined time of the day (e.g., from 3:00 pm to 6:00 pm), etc. It is contemplated for the control module 132 to include an internal clock for such purposes.

It should be noted that the computer device 134 can be a computer operated by a merchant or a cup dispensing kiosk operated by a customer. With the computer embodiment, a user purchases the beverage container 112 from the merchant and an operator, via the computer, encodes the marker information into the markers 128. With the cup dispensing kiosk embodiment, a user purchases the beverage container 112 from the kiosk and a customer, via the kiosk, encodes the marker information into the markers 128.

In any of the embodiments disclosed herein, the computer device 134 can transmit the encoded marker information to the control module 134 for storage and processing. This can be via hardwired or wireless transmission. In some embodiments, the control module 134 can be configured to not dispense any beverage for the beverage container 112 unless it first receives the encoded marker information for that beverage container 112 from the computer device 134. This can be used as a validation or verification means—i.e., in order to have the dispensing unit 102 disburse beverage, the control module 134 must receive the encoded marker information from both the computer device 134 and the readers 126.

Some embodiments can involve a user selecting a beverage container 112 from a storage area (e.g., a rack). A user can then use the dispensing unit 102 to fill the container 112 and present the filled container 112 to a merchant for purchase. The merchant can use the computer device 134 to encode the markers 128. The computer device 134 can also transmit the encoded marker information to the dispensing unit 102. Subsequent use by a user at the dispensing unit 102 can then be controlled by the control module 134 in accordance with the encoded marker information as dictated by the purchase arrangement.

It is understood that a system 100 can include any number of computer devices 134 and/or dispensing units 102. Thus, the system 100 can be configured as a network of computer devices 134 and dispensing units 102. Any one or combination of computer devices 134 can be in communication with (and transmit marking information between) any one or combination of dispensing units 102 and/or control modules 134. This may be beneficial in theme park settings, etc. Any of the dispensing units 102 and/or control modules 134, after receiving the marker information (either from the computer device 134 or from the readers 126), can transmit a confirmation signal to the computer device 134 that the marker information has been received and stored. This confirmation signal can be sent to any number of computer devices 134 or even other dispensing units 102.

It should be understood that modifications to the embodiments disclosed herein is made to meet a particular set of design criteria. For instance, the number of dispensing units 102, dispensers 118, control modules 132, computer devices 134, switches 130, displays 136, readers 126, markers 128, and other components can be any suitable number of each to meet a particular objective. The particular configuration of type of such elements can also be adjusted to meet a particular set of design criteria. Therefore, while certain exemplary embodiments of the system and methods of making and using the same have been discussed and illustrated herein, it is to be distinctly understood that the invention is not limited thereto but may be otherwise variously embodied and practiced within the scope of the following claims.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

What is claimed is:

1. A dispensing system, comprising:

a dispensing unit;

a read area having at least two readers, each of the at least two readers configured to generate a signal when aligned with and detecting a marker disposed on a beverage container, the beverage container having at least two markers associated therewith;

a switch in electro-mechanical connection with the dispensing unit; and a control module in operative connection with the switch and in communication with the at least two readers, wherein the control module actuates the switch when the at least two readers each align with a marker and generate at least two signals detecting the at least two markers.

2. The dispensing system of claim 1, wherein:

the at least two readers include a first reader and a second reader, the first reader being a same type of reader as the second reader.

3. The dispensing system of claim 1, wherein:

the at least two readers include a first reader and a second reader, the first reader being a different type of reader as the second reader.

4. The dispensing system of claim 1, wherein:

any one or combination of the at least two readers include an antenna, a scanner, a camera, a sensor, and/or a detector.

5. The dispensing system of claim 1, wherein:

each of the at least two readers include a camera and/or sensor configured to identify an aspect of a marker of the at least two markers via optical character recognition and/or vision object detection and classification.

6. The dispensing system of claim 1, wherein:

each of the at least two readers include a camera and/or sensor configured to identify a color, fluorescence, infrared emission, and/or ultraviolet emission of a marker of the at least two markers.

7. The dispensing system of claim 1, wherein:

the at least two readers include a first reader and a second reader;

the first reader positioned within the read area at a first location;

the second reader positioned within the read area at a second location; and the first location is such that a line of sight of the first reader is orthogonal to a line of sight of the second reader.

8. The dispensing system of claim 1, comprising:

the beverage container.

9. The dispensing system of claim 8, wherein:

the at least two markers include a first marker and a second marker, the first marker being a same type of marker as the second marker.

10. The dispensing system of claim 8, wherein:

the at least two markers include a first marker and a second marker, the first marker being a different type of marker as the second marker.

11. The dispensing system of claim 1, wherein:

the at least two markers include a marker configured as a Quick Response (QR) code.

12. The dispensing system of claim 1, wherein:

actuation of the switch causes the dispensing unit to dispense fluid.

13. The dispensing system of claim 1, comprising:

a structure defining the read area.

14. A detecting and control unit for a dispensing system, the detection and control unit comprising:

a structure defining a read area, the read area having at least two readers, each of the at least two readers configured to generate a signal when aligned with and detecting a marker disposed on a beverage container, the beverage container having at least two markers associated therewith;

a switch in electro-mechanical connection with a dispensing unit; and a control module in operative connection with the switch and in communication with the at least two readers, wherein the control module actuates the switch when the at least two readers each align with a marker and generate at least two signals detecting the at least two markers.

15. The detecting and control unit for a dispensing system of claim 14, wherein:

actuation of the switch causes the dispensing unit to dispense fluid.

16. The detecting and control unit for a dispensing system of claim 14, comprising:

the dispensing unit.

17. The detecting and control unit for a dispensing system of claim 14, wherein:

the at least two readers include a first reader and a second reader;

the first reader positioned within the read area at a first location;

the second reader positioned within the read area at a second location; and the first location is such that a line of sight of the first reader is orthogonal to a line of sight of the second reader.

18. The detecting and control unit for a dispensing system of claim 14, wherein:

each of the at least two readers include:

a camera and/or sensor configured to identify an aspect of a marker of the at least two markers via optical character recognition and/or vision object detection and classification; and/or a camera and/or sensor configured to identify a color, fluorescence, infrared emission, and/or ultraviolet emission of a marker of the at least two markers.

* * * * *